(12) United States Patent
Imada et al.

(10) Patent No.: US 8,946,374 B2
(45) Date of Patent: Feb. 3, 2015

(54) POLYETHER ESTER COMPOSITION, POLYURETHANE RESIN COMPOSITION, AND OPTICAL MATERIAL USING THE SAME

(75) Inventors: Tomoyuki Imada, Osaka (JP); Kouji Shiraishi, Osaka (JP)

(73) Assignee: DIC Corporation, Tokyo (JP)

( * ) Notice: Subject to any disclaimer, the term of this patent is extended or adjusted under 35 U.S.C. 154(b) by 151 days.

(21) Appl. No.: 13/394,920

(22) PCT Filed: Sep. 14, 2010

(86) PCT No.: PCT/JP2010/065777
§ 371 (c)(1),
(2), (4) Date: Mar. 8, 2012

(87) PCT Pub. No.: WO2011/034033
PCT Pub. Date: Mar. 24, 2011

(65) Prior Publication Data
US 2012/0172567 A1    Jul. 5, 2012

(30) Foreign Application Priority Data
Sep. 18, 2009   (JP) ................. 2009-217000

(51) Int. Cl.
*C08G 18/42* (2006.01)
*C08G 18/46* (2006.01)
*C08G 18/48* (2006.01)
*C08G 18/50* (2006.01)

(52) U.S. Cl.
USPC .................. 528/79; 528/28; 528/83

(58) Field of Classification Search
USPC .............................. 528/28, 79, 83
See application file for complete search history.

(56) References Cited

U.S. PATENT DOCUMENTS

| 4,128,532 A * | 12/1978 | Eimers et al. ............ 528/79 |
| 5,942,158 A * | 8/1999 | Okoroafor et al. ......... 252/586 |
| 2002/0016436 A1* | 2/2002 | Ohmori et al. ............ 528/61 |

FOREIGN PATENT DOCUMENTS

| JP | 8-208830 A | 8/1996 |
| JP | 11-279251 A | 10/1999 |
| WO | 2009107301 A1 | 9/2009 |

* cited by examiner

*Primary Examiner* — Rabon Sergent
(74) *Attorney, Agent, or Firm* — McDermott Will & Emery LLP

(57) ABSTRACT

A polyurethane resin composition for optical applications can contain, as essential components, a polyisocyanate and a polyester-ether polyol obtained by polycondensation of a glycol component containing an alkylene oxide adduct of a bisphenol and an aromatic carboxylic acid component and particularly preferably having a glass transition temperature of 50° C. or lower. An optical material using the composition is also provided for.

14 Claims, No Drawings

POLYETHER ESTER COMPOSITION, POLYURETHANE RESIN COMPOSITION, AND OPTICAL MATERIAL USING THE SAME

CROSS REFERENCE TO PRIOR APPLICATIONS

This application is a U.S. National Phase application under 35 U.S.C. §371 of International Application No. PCT/JP2010/065777, filed on Sep. 14, 2010 and claims benefit of priority to Japanese Patent Application No. 2009-217000, filed on Sep. 18, 2009. The International Application was published in Japanese on Mar. 24, 2011 as WO 2011/034033 A1 under PCT Article 21(2). The contents of the applications are hereby incorporated by reference.

TECHNICAL FIELD

The present invention relates to a polyether ester composition and a polyurethane resin composition that are particularly suitable for optical applications. More specifically, the present invention relates to a polyurethane film having a high light transmittance and a low dispersion property.

BACKGROUND ART

Examples of typical plastics for optical applications include polymethyl methacrylate and polycarbonate. Polymethyl methacrylate is advantageous in terms of transparency, weather resistance, low birefringence, and good moldability and is used in optical lenses such as a CD pick-up lens, optical films such as a retardation film, and optical disk substrates, and the like. However, polymethyl methacrylate has a serious disadvantage of a high water absorption rate. In the case where the water absorption rate is high, in optical lenses, degradation of light-focusing accuracy and a change in the refractive index are caused by swelling and deformation of the lenses. Furthermore, in disk substrates, deformation and curvature are caused by water absorption, resulting in read/write errors.

Polycarbonate is advantageous in terms of transparency, heat resistance, impact resistance, a low water absorption rate, etc. and is considered to be an important optical material. However, polycarbonate is disadvantageous in that the birefringence, which is an important characteristic in the optical system, is high. In the case where the birefringence is high, in optical disks, the polarization direction of reflected light with respect to incident light deviates, resulting in an increase in noise.

Accordingly, materials that can compensate for these disadvantages have been desired.

In general, polyurethanes are excellent in terms of oil resistance and abrasion resistance, but have low heat resistance. However, since physical properties of polyurethanes significantly vary depending on the type of raw materials, conditions for cross-linking, etc., various physical properties that cannot be exhibited by other homopolymers can be adjusted. As a polyurethane that is applied to optical applications, for example, a polyurethane obtained by using an alkylene oxide adduct of 4,4'-(9H-fluorene-9,9-diyl)bis(phenol) as a diol component has been proposed (for example, refer to Patent Literature 1). However, although a resin having a high refractive index can be obtained in this technology, the glass transition temperature of the resin is also increased and thus the resin is poor in practical use.

CITATION LIST

Patent Literature

PTL 1: Japanese Unexamined Patent Application Publication No. 11-279251

SUMMARY OF INVENTION

Technical Problem

Accordingly, an object of the present invention is to provide a polyester polyol suitable for optical applications to such an extent that there is no problem in terms of class transition temperature and solubility in solvents in practical use while having a high refractive index, and a urethane resin composition derived from the polyester polyol.

Solution to Problem

As a result of intensive studies conducted in order to achieve the above object, the inventors of the present invention found the following:
(1) By lowering the symmetry of the molecular structure (by introducing a bending portion), intermolecular interaction is weakened. Consequently, crystallinity decreases, thereby lowering the glass transition temperature.
(2) In urethane resins, in the case where a polyester-polyether polyol is used as a diol component, the glass transition temperature of the polyester-polyether polyol can be controlled to be low, and the glass transition temperature of the resulting urethane resin can also be made low.
(3) By using an alkylene oxide adduct of a bisphenol as an alcohol component of the polyester-polyether polyol, the glass transition temperature of the polyester-polyether polyol can be controlled to be low.
(4) In the case where a bisphenol derivative is used as an alcohol component of the polyester-polyether polyol and an aromatic carboxylic acid is used as a carboxylic acid component thereof, a polyester-polyether polyol having a high refractive index can be obtained.
(5) A polyurethane resin derived from the polyester-polyether polyol also has a high refractive index.

The present invention has been made on the basis of the above finding.

Specifically, the present invention provides a polyester-ether polyol composition for optical applications, the polyester-ether polyol composition containing a polycondensate of a glycol component containing an alkylene oxide adduct of a bisphenol and an aromatic carboxylic acid component containing, as essential components, a naphthalenedicarboxylic acid derivative and a phthalic acid derivative.

Furthermore, the present invention provides a polyurethane resin composition containing, as essential components, a polyisocyanate and a polyester-ether polyol obtained by polycondensation of a glycol component containing an alkylene oxide adduct of a bisphenol and an aromatic carboxylic acid component, and an optical material using the composition.

Advantageous Effects of Invention

According to the present invention, a high refractive index is realized by forming a highly aromatic structure composed of a glycol unit having a bisphenol skeleton and an aromatic carboxylic acid unit, while the glass transition temperature is controlled by controlling the orientation of the molecule with phthalic anhydride. Thus, a high-refractive-index material can be obtained by a simple and relatively inexpensive method without using a special material or without employing a special synthesis method. Furthermore, since this material has a glass transition temperature within a range of practical use in terms of urethanization, the material is also suitable for a urethane-acrylated. UV-curable optical material. Thus, it is possible to provide a urethane resin with high practical utility, the urethane resin exhibiting a high refractive index suitable for optical applications and having a relatively low glass transition temperature.

DESCRIPTION OF EMBODIMENTS

A polyurethane resin composition of the present invention contains, as an essential component, a polyester-ether polyol obtained by polycondensation of an alkylene oxide adduct of a bisphenol serving as a glycol component and an aromatic carboxylic acid serving as an acid component.

The alkylene oxide adduct of the bisphenol is preferably, for example, a compound represented by general formula (1) below.

[Chem. 1]

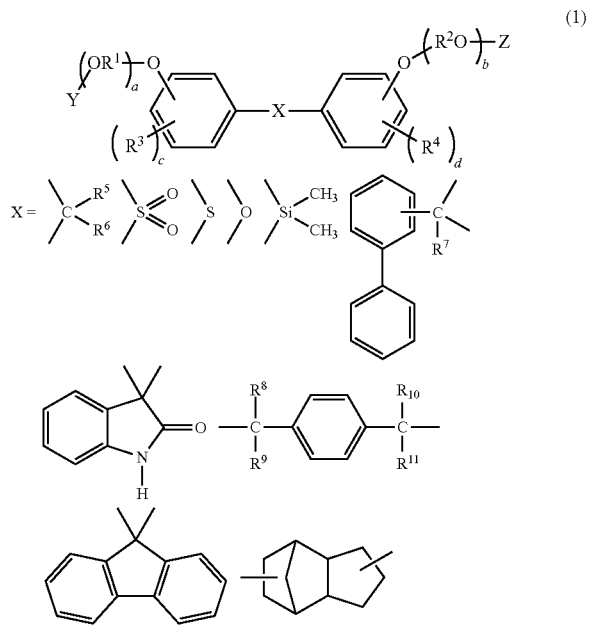

(1)

(In the formula, $R^1$ and $R^2$ each independently represent an alkylene group having 2 to 4 carbon atoms, $R^3$ to $R^{11}$ each independently represent a hydrogen atom, an aliphatic hydrocarbon group having 1 to 20 carbon atoms, an alicyclic hydrocarbon group, an aromatic hydrocarbon group, a halogen atom, or a halogenated hydrocarbon group having 1 to 20 carbon atoms, Y and Z each independently represent a hydroxyl group or an acyl grout having 2 to 12 carbon atoms, a and b each represent an integer of 2 to 10, and c and d each represent an integer of 0 to 4.)

Examples of the bisphenol in the alkylene oxide adduct of the bisphenol include, but are not particularly limited to, bisphenol A, bisphenol S, fluorinated bisphenol A, chlorinated bisphenol A, brominated bisphenol A, 4,4-bis(hydroxyphenyl)sulfide, bis(4-hydroxyphenyl)methane, bis(4-hydroxyphenyl)ether, bis(4-hydroxyphenyl)amine, and tricyclo[5.2.1.0$^{2,6}$]decane diphenol.

Among these, bisphenol S, bisphenol A, 4,4'-(3,3,5-trimethyl-1,1-cyclohexanediyl)bis(phenol), 4,4'-(9H-fluorene-9,9-diyl)bis(phenol), tricyclo[5.2.1.0$^{2,6}$]decane diphenol, etc. are preferable.

The alkylene oxide adduct in the alkylene oxide adduct of the bisphenol is preferably an alkylene oxide having 2 to 4 carbon atoms.

Regarding the amount of addition of the alkylene oxide in the alkylene oxide adduct of the bisphenol, a compound in which 2 to 10 moles of an alkylene oxide is added per equivalent of hydroxyl groups of a bisphenol is preferable from the standpoint of controlling the glass transition temperature of the resulting urethane resin, crystallinity of the resin, and solubility of the resin in solvents.

In addition, other diol components may also be incorporated, as required. Examples of the other diol components include alkylene glycols such as ethylene glycol, propylene glycol, 1,4-butane diol, 1,3-butane diol, 1,2-butylene glycol, trimethylene glycol, neopentyl glycol, diethylene glycol, 2-methyl-1,3-propylene glycol, triethylene glycol, octamethylene glycol, 1,4-cyclohexanedimethanol, 1,4-cyclohexanediol, 1,6-hexane glycol, and 3-methyl-1,5-pentanediol. These may be used alone or in combination of two or more dials.

The carboxylic acid component in the polyester-ether polyol is not particularly limited as long as the carboxylic acid component contains naphthalenedicarboxylic acid and phthalic acid as essential components. Examples of the carboxylic acid include aromatic dicarboxylic acids such as terephthalic acid, isophthalic acid, phthalic acid, naphthalene-2,6-dicarboxylic acid, naphthalene-2,7-dicarboxylic acid, diphenyl-4,4'-dicarboxylic acid, diphenoxyethane dicarboxylic acid, indene-4,7-dicarboxylic acid, naphthalene-2,5-dicarboxylic acid, naphthalene-2,6-dicarboxylic acid, azulene-2,5-dicarboxylic acid, heptalene-1,7-dicarboxylic acid, biphenylene-1,5-dicarboxylic acid, as-indacene-2,6-dicarboxylic acid, s-indacene-1,7-dicarboxylic acid, acenaphthylene-3,8-dicarboxylic acid, fluorene-1,8-dicarboxylic acid, phenalene-4,8-dicarboxylic acid, phenanthrene-1,6-dicarboxylic acid, anthracene-1,8-dicarboxylic acid, fluoranthene-6,7-dicarboxylic acid, acephenanthrylene-3,8-dicarboxylic acid, aceanthrylene-3,7-dicarboxylic acid, triphenylene-2,10-dicarboxylic acid, pyrene-1,6-dicarboxylic acid, chrysene-1,7-dicarboxylic acid, naphthacene-1,5-dicarboxylic acid, pleiadene-2,5-dicarboxylic acid, picene-2,8-dicarboxylic acid, perylene-2,8-dicarboxylic acid, pentaphene-5,11-dicarboxylic acid, pentacene-2,6-dicarboxylic acid, alkyl nuclear-substituted carboxylic acids thereof, and halogen nuclear-substituted carboxylic acids thereof.

The carboxylic acid component may be an ester or a halide (e.g., acid chloride) of any of the above carboxylic acids. Furthermore, phthalic acid or the like may be, for example, anhydride thereof.

The carboxylic acid component preferably contains compounds represented by structural formulae below.

[Chem. 2]

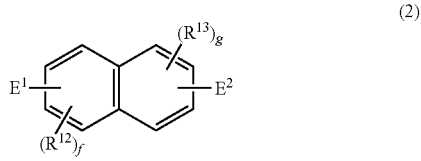

(2)

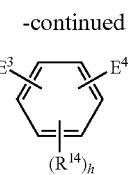

(3)

(In the formulae, $E^1$, $E^2$, $E^3$, and $E^4$ each independently represent a carboxyl group, a halocarbonyl group, an alkyloxycarbonyl group having 1 to 20 carbon atoms, a cycloalkyloxycarbonyl group having 1 to 20 carbon atoms, or an aryloxycarbonyl group having 1 to 20 carbon atoms, $R^{12}$, $R^{13}$, and $R^{14}$ each independently represent an aliphatic hydrocarbon group having 1 to 20 carbon atoms, an alicyclic hydrocarbon group, an aromatic hydrocarbon group, a halogen atom, or a halogenated hydrocarbon group having 1 to 20 carbon atoms, and f, g, and h each independently represent an integer of 0 to 4.)

Among these compounds, terephthalic acid, isophthalic acid, phthalic acid (including anhydride thereof), naphthalene-2,6-dicarboxylic acid, naphthalene-2,7-dicarboxylic acid, naphthalene-1,5-dicarboxylic acid, biphenyl-2,2'-dicarboxylic acid, uvitic acid, homophthalic acid, homoisophthalic acid, homoterephthalic acid, etc. are preferable from the standpoint that the refractive index of the resulting polyester-ether polyol can be made high.

The polyester-ether polyol is obtained by a reaction between the polyol component and the carboxylic acid component. The weight-average molecular weight of the polyester-ether polyol is preferably about 500 to 3,000. The hydroxyl value of the polyester-ether polyol is preferably 30 to 230 mgKOH/g (in terms of solid matter) from the standpoint that physical properties after urethanization can be easily controlled.

Furthermore, the content of o-phthalic acid and a derivative thereof in the aromatic carboxylic acid component is preferably 3% to 30% by mole from the standpoint that the resulting polyester polyol has good solubility in solvents.

Various methods can be employed as the method for producing the polyester-ether polyol. For example, in a reaction between a polyester-ether polyol and a carboxylic acid or a carboxylic acid ester, examples of a catalyst include acetates of an alkali metal or an alkaline earth metal and compounds of zinc, manganese, cobalt, antimony, germanium, titanium, tin, or zirconium. Among these, tetraalkyl titanate and tin oxalate are preferably used as a catalyst particularly effective for all reactions such as a transesterification reaction and a polycondensation reaction. In general, the catalyst is preferably used in an amount of 0.005% to 1.0% by weight relative to the total amount of reaction raw materials of the polyether-ester polyol.

As the catalyst, it is possible to use a small amount of a heterogeneous catalyst such as act acidic, basic, or amphoteric oxide of main group 2, main group 3, or main group 4 of the periodic table, e.g., calcium oxide, magnesium oxide, boron oxide, aluminum oxide, silicon dioxide, in particular, silicon dioxide obtained by thermal decomposition, silica gel, diatomaceous earth and/or quartz or tin dioxide; or an acidic, basic, or amphoteric oxide of sub-group 2 or sub-group 6 of the periodic table, e.g., titanium dioxide, in particular, amphoteric titanium dioxide. These catalysts are preferable from the standpoint that the catalyst has a high activity and that even if the catalyst remains in the resulting polyester polyol, it does not cause side reactions in a reaction between the polyester polyol and a polyisocyanate, for example.

The above reaction is preferably conducted at normal pressure and in a flow of an inert gas (e.g., nitrogen, argon, or the like) or at a reduced pressure from the standpoint that coloring of the resulting polyol does not occur. The reaction may be conducted at a reaction temperature of, for example, 100° C. to 300'C.

In the case where a carboxylic acid halide (e.g., carboxylic acid chloride) is used in the above reaction, it is possible to employ an interfacial polymerization method, a solution polymerization method, or the like, which is a common method for producing a polyarylate. From the standpoint of obtaining a polyol having a high purity, the interfacial polymerization method is preferable.

In the interfacial polymerization method, a polyester-ether polyol can be obtained by bringing an organic solvent solution of a carboxylic acid halide into contact with an aqueous solution of an alkylene oxide adduct of a bisphenol to perform interfacial polycondensation. More specifically, for example, a dicarboxylic acid halide is dissolved in an organic solvent, such as toluene or methylene chloride, and an alkylene oxide adduct of a bisphenol is dissolved in an aqueous solution of an alkali metal hydroxide (if necessary, in combination with a hydrophilic organic solvent) so that the concentration of each of the solutions is in the range of 0.1 to 2 mol/L. These two solutions are then brought into contact with each other. Thus, the dicarboxylic acid halide and the alkylene oxide adduct of the bisphenol are subjected to interfacial polycondensation to obtain a polyester-ether polyol. In this case, a phase-transfer catalyst or a surfactant may be added. The reaction temperature in this case is usually preferably 100° C. or lower.
(In view of consistency with Examples, the temperature was corrected from 40° C. to 45'C.)

A glass transition temperature (measured by differential scanning calorimetry (DSC)) of the polyester ether obtained by polycondensation of the alkylene oxide adduct of the bisphenol and the carboxylic acid component used in the present invention is preferably 50° C. or lower from the standpoint that the glass transition temperature of the resulting polyurethane can be lowered, significant crystallization can be suppressed, and solubility in solvents can be improved, and more preferably 45° C. or lower from the standpoint that handling of the polyester polyol resin is easy.

The refractive index of the polyester ether obtained by polycondensation of the alkylene oxide adduct of the bisphenol and the carboxylic acid component is preferably adjusted to be in the range of 1.55 to 1.6.

The polyurethane resin composition of the present invention is obtained by a reaction of a polyisocyanate and a polyester-ether polyol obtained by polycondension of a glycol component containing an alkylene oxide adduct of a bisphenol and an aromatic carboxylic acid component, the polyisocyanate and the polyester-ether polyol being essential components.

Among these components, the glycol component containing an alkylene oxide adduct of a bisphenol is preferably a compound represented by general formula (1) below.

[Chem. 3]

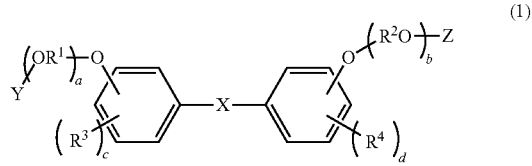

(1)

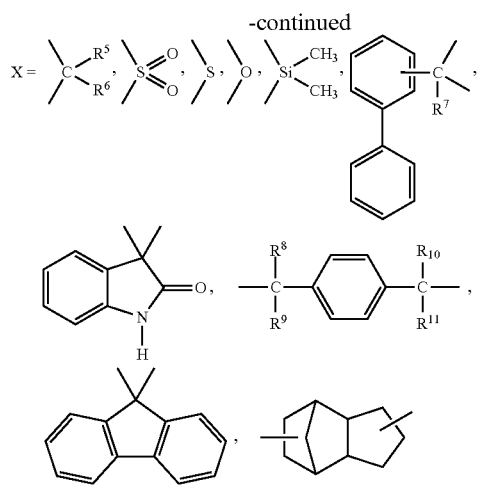

(In the formula, $R^1$ and $R^2$ each independently represent an alkylene group having 2 to 12 carbon atoms, $R^3$ to $R^{11}$ each independently represent a hydrogen atom, an aliphatic hydrocarbon group having 1 to 20 carbon atoms, an alicyclic hydrocarbon group, an aromatic hydrocarbon group, a halogen atom, or a halogenated hydrocarbon group having 1 to 20 carbon atoms. Y and Z each independently represent a hydroxyl group or an acyl group having 2 to 12 carbon atoms, a and b each represent an integer of 2 to 10, and c and d each represent an integer of 0 to 4.)

The alkylene oxide adduct of the bisphenol is preferably contained in an amount of 30% by mole or more of the glycol component from the standpoint of obtaining a resin having a high refractive index.

The polyurethane resin composition of the present invention is obtained by a reaction between the alcohol component described above and a polyisocyanate described below.

The polyurethane resin composition of the present invention may optionally contain a tertiary amine catalyst or an organometallic catalyst in order to accelerate the reaction. Examples of the tertiary amine catalyst include, but are not limited to, triethylenediamine, pentamethylenediethylenetriamine, triethylamine, N,N-dimethylethanolamine, and ethylmorpholine. Examples of the organometallic catalyst include, but are not limited to stannous octoate, dibutyltin diacetate, dibutyltin dilaurate, dibutyltin dimaleate, and sodium bicarbonate.

Regarding the ratio of the catalyst added, in the case of the organometallic catalyst, the content of a metal in the catalyst is preferably 0.005 to 5.0 parts by weight and more preferably 0.02 to 2.0 parts by weight relative to 100 parts by weight of the solid of the polyester-polyether polyol and the polyisocyanate.

The polyurethane resin composition for optical applications of the present invention may be in the form of an organic solvent solution or in the form of an aqueous polyurethane resin composition. In the case where the composition is in the form of an organic solvent solution, the following solvents can be used.

As for the organic solvents, for example, polar organic solvents, such as dimethylformamide, dimethylacetamide, methyl-2-pyrrolidone, dimethyl sulfoxide, sulfolane, and γ-butyrolactone can be used as aprotic polar organic solvents. Besides the above solvents, ether solvents, ester solvents, ketone solvents, petroleum solvents, and the like may also be used as long as the polyurethane resin composition is soluble in the solvents. Furthermore, various types of solvents may be used in combination.

Examples of the ether solvent include ethylene glycol dialkyl ethers such as ethylene glycol dimethyl ether, ethylene glycol diethyl ether, and ethylene glycol dibutyl ether; polyethylene glycol dialkyl ethers such as diethylene glycol dimethyl ether, diethylene glycol diethyl ether, diethylene glycol dibutyl ether, triethylene glycol dimethyl ether, triethylene glycol diethyl ether, and triethylene glycol dibutyl ether; ethylene glycol monoalkyl ether acetates such as ethylene glycol monomethyl ether acetate, ethylene glycol monoethyl ether acetate, and ethylene glycol monobutyl ether acetate; polyethylene glycol monoalkyl ether acetates such as diethylene glycol monomethyl ether acetate, diethylene glycol monoethyl ether acetate, diethylene glycol monobutyl ether acetate, triethylene glycol monomethyl ether acetate, triethylene glycol monoethyl ether acetate, and triethylene glycol monobutyl ether acetate;

propylene glycol dialkyl ethers such as propylene glycol dimethyl ether, propylene glycol diethyl ether, and propylene glycol dibutyl ether; polypropylene glycol dialkyl ethers such as dipropylene glycol dimethyl ether, dipropylene glycol diethyl ether, dipropylene glycol dibutyl ether, tripropylene glycol dimethyl ether, tripropylene glycol diethyl ether, and tripropylene glycol dibutyl ether; propylene glycol monoalkyl ether acetates such as propylene glycol monomethyl ether acetate, propylene glycol monoethyl ether acetate, and propylene glycol monobutyl ether acetate; polypropylene glycol monoalkyl ether acetates such as dipropylene glycol monomethyl ether acetate, dipropylene glycol monoethyl ether acetate, dipropylene glycol monobutyl ether acetate, tripropylene glycol monomethyl ether acetate, tripropylene glycol monoethyl ether acetate, and tripropylene glycol monobutyl ether acetate; dialkyl ethers of a copolymerized polyether glycol, such as a low-molecular-weight ethylene-propylene copolymer; monoacetate monoalkyl ethers of a copolymerized polyether glycol; alkyl esters of a copolymerized polyether glycol; and monoalkyl ester monoalkyl ethers of a copolymerized polyether glycol.

Examples of the ester solvent include ethyl acetate and butyl acetate. Examples of the ketone solvent include acetone, methyl ethyl ketone, and cyclohexanone. Examples of the petroleum solvent that can be used include aromatic solvents such as toluene, xylene, and other aromatic solvents having a high boiling point; aliphatic solvents such as hexane; and alicyclic solvents such as cyclohexane.

The organic solvents are preferably aprotic organic solvents that do not have an active proton, e.g., a hydroxyl group or an amino group, because a compound having an isocyanate group is used as a raw material component.

An example of the aqueous polyurethane resin composition is a composition obtained by mixing a dispersion liquid prepared by dispersing the polyester-polyether polyol in an aqueous medium (water to which an organic solvent is added as required) with an aqueous polyisocyanate dispersion. A surfactant may be further added thereto.

An example of the aqueous polyisocyanate dispersion is a self-emulsifying polyisocyanate having excellent, water dispersion stability, the self-emulsifying polyisocyanate being obtained by mixing an ionic surfactant with a hydrophilic polyisocyanate in which a nonionic-hydrophilic-group-containing compound is introduced into a hydrophobic polyisocyanate obtained from an organic polyisocyanate having two or more isocyanate groups per molecule.

The glass transition temperature (measured by DSC) of the polyester ether obtained by polycondensation of the alkylene oxide adduct of the bisphenol and the carboxylic acid component used in the present invention is preferably 50° C. or lower from the standpoint that the glass transition temperature of the resulting polyurethane can be lowered, significant crystallization can be suppressed, and solubility in solvents can be improved, and more preferably 40° C. or lower from the standpoint that handling of the polyester polyol resin is easy.

The refractive index of the polyester ether obtained by polycondensation of the alkylene oxide adduct of the bisphenol and the carboxylic acid component is preferably adjusted to be in the range of 1.55 to 1.65.

Examples of the polyisocyanate used in the present invention include aliphatic diisocyanates such as hexamethylene diisocyanate, trimethylhexamethylene diisocyanate, dimer acid diisocyanate, and lysine diisocyanate; and biuret-type adducts and isocyanurate ring adducts of any of these diisocyanates; alicyclic diisocyanates such as isophorone diisocyanate, 4,4'-methylenebis(cyclohexyl isocyanate), methylcyclohexane-2,4-(or -2,6-)diisocyanate, 1,3-(or 1,4-)di(isocyanatomethyl)cyclohexane, 1,4-cyclohexane diisocyanate, 1,3-cyclopentane diisocyanate, 1,2-cyclohexane diisocyanate, and norbornene diisocyanate; and biuret-type adducts and isocyanurate ring adducts of any of these diisocyanates; aromatic diisocyanate compounds such as xylylene diisocyanate, meta-xylylene diisocyanate, tetramethyl xylylene diisocyanate, tolylene diisocyanates, tolylene diisocyanate having an isomer ratio of 2,4/2,6=80/20 (80/20TDI), 65/35TDI, and 2, 4-100TDI, diphenylmethane diisocyanates, e.g., 4,4'-diphenylmethane diisocyanate (pure or monomeric MDI) and isomers thereof, and polymeric MDI, 1,5-naphthalene diisocyanate, 1,4-naphthalene diisocyanate, 4,4'-toluidine diisocyanate, 4,4'-diphenyl ether diisocyanate, (m- or p-) phenylene diisocyanate, 4,4'-biphenylene diisocyanate, 3,3'-dimethyl-4,4'-biphenylene diisocyanate, bis(4-isocyanatophenyl)sulfone, and isopropylidene bis(4-phenylisocyanate); and biuret-type adducts and isocyanurate ring adducts of any of these diisocyanates; polyisocyanates having three or more isocyanate groups per molecule, such as triphenylmethane-4,4',4''-triisocyanate, 1,3,5-triisocyanatobenzene, 2,4,6-triisocyanatotoluene, and 4,4'-dimethyldiphenylmethane-2,2',5,5'-tetraisocyanate; and biuret-type adducts and isocyanurate ring adducts of any of these polyisocyanates; and urethanized adducts obtained by allowing a polyisocyanate compound to react with hydroxyl groups of a polyol such as ethylene glycol, propylene glycol, 1,4-butylene glycol, dimethylolpropionic acid, polyalkylene glycol, trimethylolpropane, or hexanetriol in a ratio in which the amount of isocyanate group is excessive; and biuret-type adducts and isocyanurate ring adducts of any of these polyisocyanates. Among these, isophorone diisocyanate, 1,4-cyclohexane diisocyanate, norbornene diisocyanate, meta-xylylene diisocyanate, 1,5-naphthalene diisocyanate, 1,4-naphthalene diisocyanate, phenylene diisocyanate, etc. are preferable from the standpoint of optical properties such as the refractive index and weather resistance.

Regarding the mixing ratio of the polyester-ether polyol and the polyisocyanate in the polyurethane resin composition of the present invention, a ratio [(i)/(ii)] the hydroxyl equivalent (i) of the polyester-ether polyol to the isocyanate equivalent (ii) of the polyisocyanate is preferably in the range of 0.90 to 1.10 from the standpoint of a good balance of physical properties of the resulting urethane resin.

The polyurethane resin composition of the present invention can usually provide a high-refractive-index cured product having a refractive index (at 25° C.) of 1.55 or more. Furthermore, the cured product is excellent in terms of transparency.

As described above, since cured products of the polyurethane resin composition (i.e., reaction products of the polyol and polyisocyanate in the composition) of the present invention have a high refractive index and transparency, they can be used as various optical materials such as lens sheets of a Fresnel lens, a lenticular lens, a prism sheet, and the like and plastic lenses. More specifically, examples of applications of the lens sheet include a video projector, a projection television, and a liquid crystal display. The composition of the present invention can be particularly preferably used as coating agents of these optical materials and lens sheets.

Various methods can be employed as a method for using the polyurethane resin composition of the present invention. For example, the composition may be applied on a plastic film substrate using an applicator bar or the like, and may then be cured by heating. In the case where a plurality of plastic substrates are bonded to each other to produce a component, a film or sheet substrate is laminated on the applied and dried composition while heating.

The polyurethane resin composition of the present invention can usually provide a high-refractive-index cured product having a refractive index (at 25° C.) of 1.55 or more. Accordingly, for example, in the case where a cycloolefin polymer film is coated with the polyurethane resin composition or in the case where a lens sheet composed of the polyurethane resin composition is formed on a cycloolefin polymer film, it is possible to solve a problem that the light transmittance is decreased because the refractive index of the resulting cured product of the polyurethane resin composition is lower than that of the cycloolefin polymer. The term "cycloolefin polymer" is a generic name of resins obtained from a cyclic olefin such as norbornene, tetracyclododecene, a derivative thereof, or the like, and examples of the cycloolefin polymer include polymers described in Japanese Unexamined Patent Application Publication Nos. 3-14882 and 3-122137. Specific examples thereof include ring-opening polymers of a cyclic olefin, addition polymers of a cyclic olefin, random copolymers of a cyclic olefin and an α-olefin such as ethylene or propylene, and graft-modified products obtained by modifying any of these polymers and copolymers with an unsaturated carboxylic acid or a derivative thereof. Specific examples thereof further include hydrides of any of the above polymers, copolymers, and graft-modified products. Examples of commercial products of the cycloolefin polymer include ZEONEX and ZEONOR manufactured by Zeon Corporation, ARTON manufactured by JSP. Corporation, and TOPAS manufactured by TICONA. These polymers have a refractive index of about 1.51 to 1.54.

EXAMPLES

The present invention will now be described in more detail by way of Examples. In Examples, the term "part" and "%" are on a weight basis unless otherwise stated.

Measurement of Refractive Index of Resin

A refractive index of the C-line of a polyester polyol resin was measured using a refractometer (manufactured by Atago Co., Ltd., digital refractometer RX-5000α).

Preparation of Film and Measurement of Refractive Index and Abbe Number

A urethane resin obtained using a polyester polyol prepared in each of Examples and Comparative Examples was prepared into a dimethylformamide (DMF) solution having a non-volatile content of 0%. The solution was applied onto a polyethylene terephthalate (PET) film so as to have a thickness of 100 μm, and dried under the conditions of 80° C. for 10 minutes and 120° C. for 10 minutes to obtain a polyurethane film having a thickness of 50 μm. The refractive index and Abbe number of the resulting film were measured with an Abbe refractometer (manufactured by ERMA Inc., ER-7MW) using 1-bromonaphthalene as a contact liquid. Note that nD, nF, and nC in Tables below represent refractive indices of the D-line, the F-line, and the C-line of the Fraunhofer lines.

The measurement of the refractive index in the present invention and the percentage were conducted at 25° C. unless otherwise stated.

Measurement of Glass Transition Temperature

Scanning was conducted twice using a differential scanning calorimeter (manufactured by TA Instruments, differential scanning calorimeter (DSC) Q100) in a nitrogen atmosphere under the conditions of a temperature range of –100° C. to 250° C. and a temperature-increasing rate of 10'C/min. The glass transition temperature (Tg) was determined on the basis of the measurement result of the second scanning.

Example 1

In a four-necked flask, 336 parts of diethylene glycol, 1,039 parts of SEO-2 (ethylene oxide 2-mole adduct of bisphenol S, manufactured by Nicca Chemical Co., Ltd.), 626 parts of phthalic anhydride, and 0.06 parts of tetrabutyl titanate were charged, and the resulting mixture was allowed to react in a nitrogen flow at 220° C. or 24 hours. A polyester polyol (PES1) obtained after the reaction was a yellow solid at room temperature and had an acid value of 9.23 mgKOH/g and a hydroxyl value of 107.7 mgKOH/g. The obtained results are shown in Table 1.

Example 2

A polyester polyol (PES2) was obtained by performing the same procedure as in Synthesis Example 1 except that 2,167 parts of NEWPOL-BPE-20T (ethylene oxide 2-mole adduct bisphenol A, manufactured by Sanyo Chemical industries, Ltd.), 473 parts of dimethyl 2,6-naphthalene dicarboxylate, 301 parts of dimethyl terephthalate, and 57 parts of phthalic anhydride were used as raw materials. The PES2 was a yellow solid at room temperature and had an acid value of 0.08 mgKOH/g and a hydroxyl value of 102.0 mgKOH/g. The obtained results are shown in Table 1

Example 3

A polyester polyol (PES3) was obtained by performing the same procedure as in Synthesis Example 1 except that 3,009 parts of NEWPOL-BPE-20T, 369 parts of isophthalic acid, 540 parts of dimethyl terephthalate, and 82 parts of phthalic anhydride were used as raw materials. The PES3 was a pale yellow solid at room temperature and had an acid value of 0.05 mgKOH/g and a hydroxyl value of 111.6 mgKOH/g. The obtained results are shown in Table 1.

Example 4

First, 2,191 parts of NEWPOL-BPE-20T (ethylene oxide 2-mole adduct of bisphenol A, manufactured by Sanyo Chemical Industries, Ltd.), 290 parts of dimethyl 2,6-naphthalene dicarboxylate, 461 parts of dimethyl terephthalate, 59 parts of phthalic anhydride, and 0.06 parts of tetrabutyl titanate were charged, and the resulting mixture was allowed to react in a nitrogen flow at 220° C. for 24 hours. A polyester polyol (PES4) obtained after the reaction was a pale yellow solid at room temperature and had an acid value of 0.05 and a hydroxyl value of 109.4. The obtained results are shown in Table 1.

Example 5

A polyester polyol (PES5) was obtained by performing the same procedure as in Synthesis Example 1 except that 2,123 parts of NEWPOL-BPE-20T, 822 parts of dimethyl 2,6-naphthalene dicarboxylate, and 55 parts of phthalic anhydride were used as raw materials. The PES3 was a yellow solid at room temperature and had an acid value of 0.08 and a hydroxyl value of 112.1. The obtained results are shown in Table 1.

TABLE 1

| | Example 1 | Example 2 | Example 3 | Example 4 | Example 5 |
|---|---|---|---|---|---|
| Polyester - ether polyol | PES1 | PES2 | PES3 | PES4 | PES5 |
| Resin composition | DEG/ BPS-oPA | BPA-NDCM/ DMT/oPA | BPA-iPA/ DMT/ oPA | BPA-NDCM/ tPA/oPA | BPA-NDCM/ oPA |
| Refractive index | 1.577 | 1.601 | 1.589 | 1.595 | 1.607 |
| Tg (° C.) (DSC) | 29.0 | 39.3 | 31.5 | 37.8 | 41.9 |

Example 6

In a four-necked flask, a total of 700 parts of the polyester polyol PES1 of Example 1 and isophorone diisocyanate in a ratio of [hydroxyl group/NCO]=1/0.98 (molar ratio), 300 parts of dimethylformamide, and 0.15 parts of NEOSTANN 01-28 (manufactured by Nitto Kasei Co., Ltd., inorganic tin catalyst) were charged, and the resulting mixture was allowed to react in a nitrogen flow at 80° C. for three hours. A resulting polyurethane solution (U1) had a viscosity of 156,200 mPa·s and a non-volatile content of 70.1%. The obtained results are shown in Table 2-1.

Example 7

A polyurethane solution (U2) was obtained by performing the same procedure as in Example 1 except that the PES2 was used as a polyester polyol of a raw material. The U2 had a viscosity of 171,900 mPa·s and a non-volatile content of 69.8%. The obtained results are shown in Table 2-1.

Example 8

A polyurethane solution (U3) was obtained by performing the same procedure as in Example 1 except that the PES3 was used as a polyester polyol of a raw material. The U3 had a viscosity of 158,800 mPa·s and a non-volatile content of 70.0%. The obtained results are shown in Table 2.

TABLE 2

| | Example 6 | Example 7 | Example 8 |
|---|---|---|---|
| Polyurethane | U1 | U2 | U3 |
| Refractive index nD | 1.560 | 1.586 | 1.576 |
| Refractive index nF | 1.574 | 1.600 | 1.587 |
| Refractive index nC | 1.554 | 1.580 | 1.570 |
| Abbe number ν | 28.0 | 29.3 | 33.9 |

Comparative Example 1

A polyester polyol (PESR1) was obtained by performing the same procedure as in Synthesis Example 1 except that 1,424 parts of diethylene glycol and 1,576 parts of adipic acid were used as raw materials. The PESR1 was a transparent solid at room temperature and had 0.41 mgKOH/g and a hydroxyl value of 110.7 mgKOH/g. The obtained results are shown in Table 3.

Comparative Example 2

A polyester polyol (PESR2) was obtained by performing the same procedure as in Synthesis Example 1 except that 1,415 parts of diethylene glycol and 1,585 parts of phthalic anhydride were used as raw materials. The PESR2 was a transparent liquid at room temperature and had an acid value of 0.49 mgKOH/g and a hydroxyl value of 108.7 mgKOH/g. The obtained results are shown in Table 3.

Comparative Example 3

A polyester polyol (PESR3) was obtained by performing the same procedure as in Synthesis Example 1 except that 2,231 parts of 1,4-cyclohexanedimethanol and 1,769 parts of hexahydrophthalic anhydride were used as raw materials. The PESR3 was a transparent solid at room temperature and had an acid value of 0.04 and a hydroxyl value of 114.1. The obtained results are shown in Table 3.

Comparative Example 4

A polyester polyol (PESR4) was obtained by performing the same procedure as in Synthesis Example 1 except that 3,130 parts of NEWPOL-BPE-20T and 870 parts of adipic acid were used as raw materials. The PESR4 was a pale yellow solid at room temperature and had an acid value of 0.03 mgKOH/g and a hydroxyl value of 112.0 mgKOH/g. The obtained results are shown in Table 3.

Comparative Example 5

A polyester polyol (PESR5) was obtained by performing the same procedure as in Synthesis Example 1 except that 1,679 parts of diethylene glycol, 1,445 parts of dimethyl 2,6-naphthalene dicarboxylate, and 876 parts of phthalic anhydride were used as raw materials. The PESR5 was a white solid at room temperature and had an acid value of 0.43 mgKOH/g and a hydroxyl value of 105.5 mgKOH/g. The obtained results are shown in Table 3.

TABLE 3

| | Comparative Example 1 | Comparative Example 2 | Comparative Example 3 | Comparative Example 4 | Comparative Example 5 |
|---|---|---|---|---|---|
| Polyester-ether polyol | PESR1 | PESR2 | PESR3 | PESR4 | PESR5 |
| Resin composition | DEG-AA | DEG-oPA | CHDM-HHPA | BPA-AA | DEG-NDCM/oPA |
| Refractive index | 1.475 | 1.539 | 1.526 | 1.543 | 1.578 |
| Tg (DSC) | −17.9 | −22 | 10.3 | 3.4 | 132.9 |

Comparative Example 6

A polyurethane solution (UR1) was obtained by performing the same procedure as in Example 6 except that the PESR1 was used as a polyester polyol of a raw material. The UR1 had a viscosity of 145,200 mPa·s and a non-volatile content of 70.5%. The obtained results are shown in Table 4.

Comparative Example 7

A polyurethane solution (UR2) was obtained by performing the same procedure as in Example 6 except that the PESR2 was used as a polyester polyol of a raw material. The UR2 had a viscosity of 148,600 mPa·s and a non-volatile content of 70.3%. The obtained results are shown in Table 4.

Comparative Example 8

A polyurethane solution (UR3) was obtained by performing the same procedure as in Example 6 except that the PESR3 was used as a polyester polyol of a raw material. The UR3 had a viscosity of 155,900 mPa·s and a non-volatile content of 69.9%. The obtained results are shown in Table 4.

Comparative Example 9

A polyurethane solution (UR4) was obtained by performing the same procedure as in Example 6 except that the PESR4 was used as a polyester polyol of a raw material. The UR4 had a viscosity of 154,700 mPa·s and a non-volatile content of 70.2%. The obtained results are shown in Table 4.

Comparative Example 10

The PESR5 was used as a polyester polyol of a raw material. The solubility of the PESR5 in dimethylformamide was 7.5% by weight. The PESR5 was allowed to react with isophorone diisocyanate as in Synthesis Example 4 in a ratio of OH/NCO=1/0.98 mol/mol in the presence of an inorganic tin catalyst in a nitrogen flow at 80° C. for ten hours. However, the reaction hardly proceeded, and thus it was considered that urethanization could not be performed.

TABLE 4

| | Comparative Example 6 | Comparative Example 7 | Comparative Example 8 | Comparative Example 9 |
|---|---|---|---|---|
| Polyurethane | UR1 | UR2 | UR3 | UR4 |
| Refractive index nD | 1.467 | 1.525 | 1.515 | 1.529 |
| nF | 1.474 | 1.537 | 1.520 | 1.541 |
| nC | 1.463 | 1.520 | 1.511 | 1.524 |
| Abbe number ν | 42.5 | 30.9 | 57.2 | 31.1 |

INDUSTRIAL APPLICABILITY

Plastic lenses and coating agents thereof, coating agents for a surface of liquid crystal glass (refractive-index-adjusting layer), optical disk substrates, plastic optical fibers, and retardation films.

The invention claimed is:

1. A polyurethane resin composition obtained by allowing a polyisocyanate to react with a polyester-ether polyol obtained by polycondensation of a glycol component containing an alkylene oxide adduct of a bisphenol and an aromatic carboxylic acid component, wherein the polyester-ether polyol has a refractive index of 1.55 to 1.65 at 25° C. and a glass transition temperature of 50° C. or lower as measured by differential scanning calorimetry (DSC), and wherein the polyurethane resin composition provides, upon curing, a product having a refractive index of 1.55 or more at 25° C.

2. The polyurethane resin composition according to claim 1, wherein the glycol component containing the alkylene oxide adduct of the bisphenol is represented by general formula (1) below:

(1)

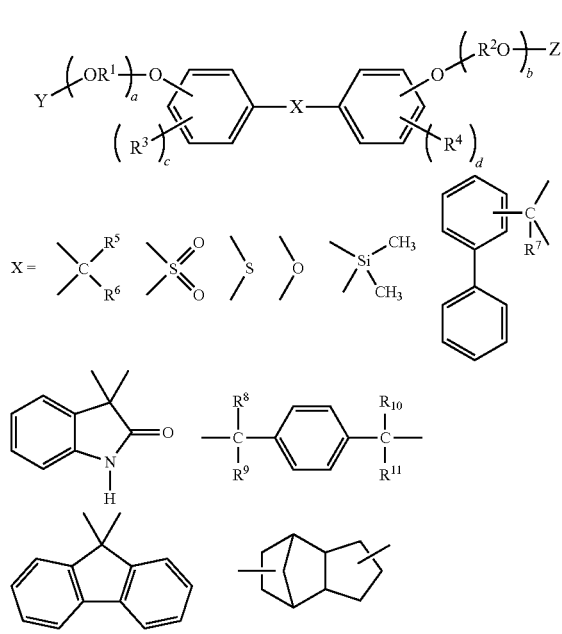

where $R^1$ and $R^2$ each independently represent an alkylene group having 2 to 12 carbon atoms, $R^3$ to $R^{11}$ each independently represent a hydrogen atom, an aliphatic hydrocarbon group having 1 to 20 carbon atoms, an alicyclic hydrocarbon group, an aromatic hydrocarbon group, a halogen atom, or a halogenated hydrocarbon group having 1 to 20 carbon atoms, Y and Z each represent hydrogen, a and b each represent an integer of 2 to 10, and c and d each represent an integer of 0 to 4.

3. The polyurethane resin composition according to claim 1, wherein the content of the alkylene oxide adduct of the bisphenol is 30% by mole or more of the glycol component.

4. The polyurethane resin composition according to claim 1, wherein the aromatic carboxylic acid component is an aromatic carboxylic acid component represented by general formula (2) and/or general formula (3) below:

(2)

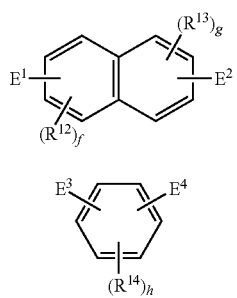

(3)

where $E^1$, $E^2$, $E^3$, and $E^4$ each independently represent a carboxyl group, a halocarbonyl group, an alkyloxycarbonyl group having 1 to 20 carbon atoms, a cycloalkyloxycarbonyl group having 1 to 20 carbon atoms, or an aryloxycarbonyl group having 1 to 20 carbon atoms, $R^{12}$, $R^{13}$, and $R^{14}$ each independently represent an aliphatic hydrocarbon group having 1 to 20 carbon atoms, an alicyclic hydrocarbon group, an aromatic hydrocarbon group, a halogen atom, or a halogenated hydrocarbon group having 1 to 20 carbon atoms, and f, g, and h each independently represent an integer of 0 to 4.

5. The polyurethane resin composition according to claim 1, wherein the aromatic carboxylic acid component contains o-phthalic acid and/or phthalic anhydride.

6. The polyurethane resin composition according to claim 5, wherein the o-phthalic acid and/or phthalic anhydride is used in an amount of 5% to 100% by mole of the total of the aromatic carboxylic acid component.

7. An optical material comprising a polyurethane resin composition obtained by allowing a polyisocyanate to react with a polyester-ether polyol obtained by polycondensation of a glycol component containing an alkylene oxide adduct of a bisphenol and an aromatic carboxylic acid component, wherein the polyester-ether polyol has a refractive index of 1.55 to 1.65 at 25° C. and a glass transition temperature of 50° C. or lower as measured by differential scanning calorimetry (DSC).

8. A polyurethane resin composition obtained by allowing a polyisocyanate to react with a polyester-ether polyol polycondensation of a glycol component containing an alkylene oxide adduct of a bisphenol and an aromatic carboxylic acid component, wherein the polyester-ether polyol has a refractive index of 1.55 to 1.65 at 25° C. and a glass transition temperature of 50° C. or lower as measured by differential scanning calorimetry (DSC), and wherein the ratio of hydroxyl equivalents of the polyester-ether polyol to isocyanate equivalents of the polyisocyanate is in the range of 0.90:1 to 1.10:1.

9. The polyurethane resin composition according to claim 5, wherein the o-phthalic acid and/or phthalic anhydride is used in an amount of 3% to 30% by mole of the total of the aromatic carboxylic acid component.

10. The optical material according to claim 7, wherein the glycol component containing the alkylene oxide adduct of the bisphenol is represented by general formula (1) below:

(1)

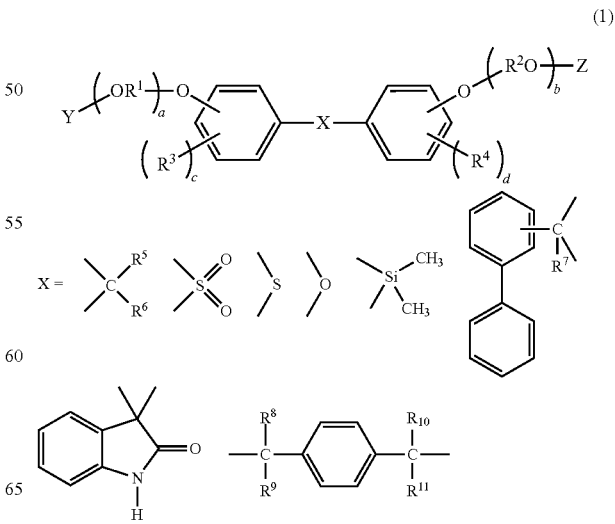

-continued

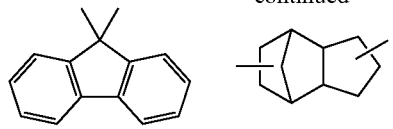

where $R^1$ and $R^2$ each independently represent an alkylene group having 2 to 12 carbon atoms, $R^3$ to $R^{11}$ each independently represent a hydrogen atom, an aliphatic hydrocarbon group having 1 to 20 carbon atoms, an alicyclic hydrocarbon group, an aromatic hydrocarbon group, a halogen atom, or a halogenated hydrocarbon group having 1 to 20 carbon atoms, Y and Z each represent hydrogen, a and b each represent an integer of 2 to 10, and c and d each represent an integer of 0 to 4.

11. The optical material according to claim 7, wherein the content of the alkylene oxide adduct of the bisphenol is 30% by mole or more of the glycol component.

12. The optical material according to claim 7, wherein the aromatic carboxylic acid component is an aromatic carboxylic acid component represented by general formula (2) and/or general formula (3) below:

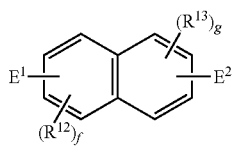

(2)

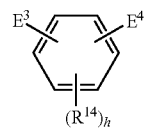

(3)

where $E^1$, $E^2$, $E^3$, and $E^4$ each independently represent a carboxyl group, a halocarbonyl group, an alkyloxycarbonyl group having 1 to 20 carbon atoms, a cycloalkyloxycarbonyl group having 1 to 20 carbon atoms, or an aryloxycarbonyl group having 1 to 20 carbon atoms, $R^{12}$, $R^{13}$, and $R^{14}$ each independently represent an aliphatic hydrocarbon group having 1 to 20 carbon atoms, an alicyclic hydrocarbon group, an aromatic hydrocarbon group, a halogen atom, or a halogenated hydrocarbon group having 1 to 20 carbon atoms, and f, g, and h each independently represent an integer of 0 to 4.

13. The optical material according to claim 7, wherein the aromatic carboxylic acid component contains o-phthalic acid and/or phthalic anhydride.

14. The optical material according to claim 13, wherein the o-phthalic acid and/or phthalic anhydride is used in an amount of 5% to 100% by mole of the total of the aromatic carboxylic acid component.

* * * * *